United States Patent [19]

Hong

[11] Patent Number: 6,003,145
[45] Date of Patent: Dec. 14, 1999

[54] COMPUTER MONITORING APPARATUS AND A METHOD OF CONTROLLING THE SAME

[75] Inventor: Bum-Ryong Hong, Seoul, Rep. of Korea

[73] Assignee: SamSung Electronics Co., Ltd., Suwon, Rep. of Korea

[21] Appl. No.: 08/852,071

[22] Filed: May 6, 1997

[30] Foreign Application Priority Data

May 6, 1996 [KR] Rep. of Korea ................. 96/14681

[51] Int. Cl.[6] ........................................... G06F 11/34
[52] U.S. Cl. ........................ 714/47; 714/43; 714/33; 714/56
[58] Field of Search .................... 395/183.19, 185.09, 395/184.01, 182.03, 183.15, 183.22, 182.02, 185.04, 185.01, 200, 200.3, 200.54, 568, 595, 183.09; 340/172.5, 825.06; 364/468.15, 550

[56] References Cited

U.S. PATENT DOCUMENTS

| | | | |
|---|---|---|---|
| 4,225,921 | 9/1980 | Hartley et al. ......................... 364/200 |
| 4,618,995 | 10/1986 | Kemp ........................................ 455/2 |
| 5,432,715 | 7/1995 | Shigematsu et al. ............. 364/551.01 |
| 5,440,722 | 8/1995 | VanderSpek et al. ............ 395/183.19 |
| 5,483,631 | 1/1996 | Nagai et al. ............................. 395/155 |

*Primary Examiner*—Robert W. Beausoliel, Jr.
*Assistant Examiner*—Andy Nguyen
*Attorney, Agent, or Firm*—Robert E. Bushnell, Es

[57] ABSTRACT

A computer monitoring apparatus for use with a computer system having a plurality of components interconnected by a system bus is provided to display system information related to the components and data information being transferred through the system bus, and comprises a controller for generating an operation inhibiting signal and a plurality of control signals in accordance with a function selection signal of a key input section, a buffer for temporally storing the system and data information, and a display section for displaying the system and data information on a screen thereof.

6 Claims, 5 Drawing Sheets

COMPUTER MONITORING APPARATUS AND A METHOD OF CONTROLLING THE SAME

CLAIM OF PRIORITY

This application makes reference to, incorporates the same herein, and claims all benefits accruing under 35 U.S.C. §119 from an application for A COMPUTER MONITORING APPARATUS AND A METHOD OF CONTROLLING THE SAME earlier filed in the Korean Industrial Property Office on May 6, 1996 and there duly assigned Ser. No. 14681/1996.

FIELD OF THE INVENTION

The present invention relates to an apparatus for monitoring a computer system and, more particularly, to a computer monitoring apparatus capable of displaying information related to operating conditions of a computer system, and a method of controlling the same.

BACKGROUND OF THE INVENTION

With the rapid development in the performance of computer systems, computer systems are popularly used in many fields. Particularly, so as to improve the performance of a computer system, the computer system must be provided with hardware components and/or software components for performing a variety of functions. Such components are normally interconnected by a system bus, which is provided to transfer some information between the components.

However, in case of a computer system with a variety of functions, if there occurs a system failure, it is difficult to check operating conditions of the computer system in order to recover the computer system.

There are several cases of system failure in the computer system. As one of them, the computer system may be mal-operated or halted because of the incorrect transfer of signals between the hardware/software components. The computer system may also fail because of an incomplete program being performed in the computer system. In case of system failure, an operator cannot easily check the cause of the system failure without the use of a computer monitoring apparatus.

Several U.S. Patents address this issue. For example, U.S. Pat. No. 5,337,413 for an *Environment Monitoring System For Standard Interface Bus Computer Systems* to Lui et al discloses an apparatus and method for monitoring the environment of remote components attached to a host processor via a standard interface bus.

What is needed is a simple design for a bus monitor that uses the bus clock to drive the monitoring equipment. Discrete logic circuits enable the bus clock to drive the clock for the bus monitor.

SUMMARY OF THE INVENTION

It is therefore an object to provide a computer monitoring apparatus which is capable of monitoring the operating conditions of the computer system, using information being transferred through a system bus therein, and a method of controlling the same.

It is another object to provide a computer monitoring apparatus which is capable of monitoring system information related to components, which are connected with a system bus of the computer system, and data information being transferred through the system bus so that an operator can easily view the operating conditions of the computer system by means of a display connected to the apparatus, and a method of controlling the same.

These and other objects may be achieved by a computer monitoring apparatus provided for use with a computer system having a plurality of components interconnected by a system bus for transferring information between said components. The apparatus is made up of an input section composed of a plurality of keys, for generating a function selection signal necessary for monitoring; a controller for generating an operation inhibiting signal and a plurality of control signals required for controlling overall functions of the computer monitoring apparatus; a clock generator for generating a clock signal in response to said control signals and inhibiting occurrence of said clock signal in response to said operation inhibiting signal; a buffer means for temporally storing system information related to said components and data information being transferred through said system bus by means of said controller; an address generator for receiving said clock signal from said clock generator and generating an address signal by means of said controller; a memory responsive to said control signals from said controller, for storing said system information from said buffer means in accordance with said address signal; and a display section for displaying said system and said data information on a screen thereof.

According to another aspect of the present invention, a method of controlling a computer monitoring apparatus is made up of the steps of initializing said the computer monitoring apparatus; storing said system information from said computer system; displaying said system information on said display section; determining whether a key entry necessary for monitoring is inputted by an operator; displaying, if so, the latest monitoring results on said display section; determining whether a key entry for selecting a function is inputted; and performing a function control program corresponding to said selected key entry.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
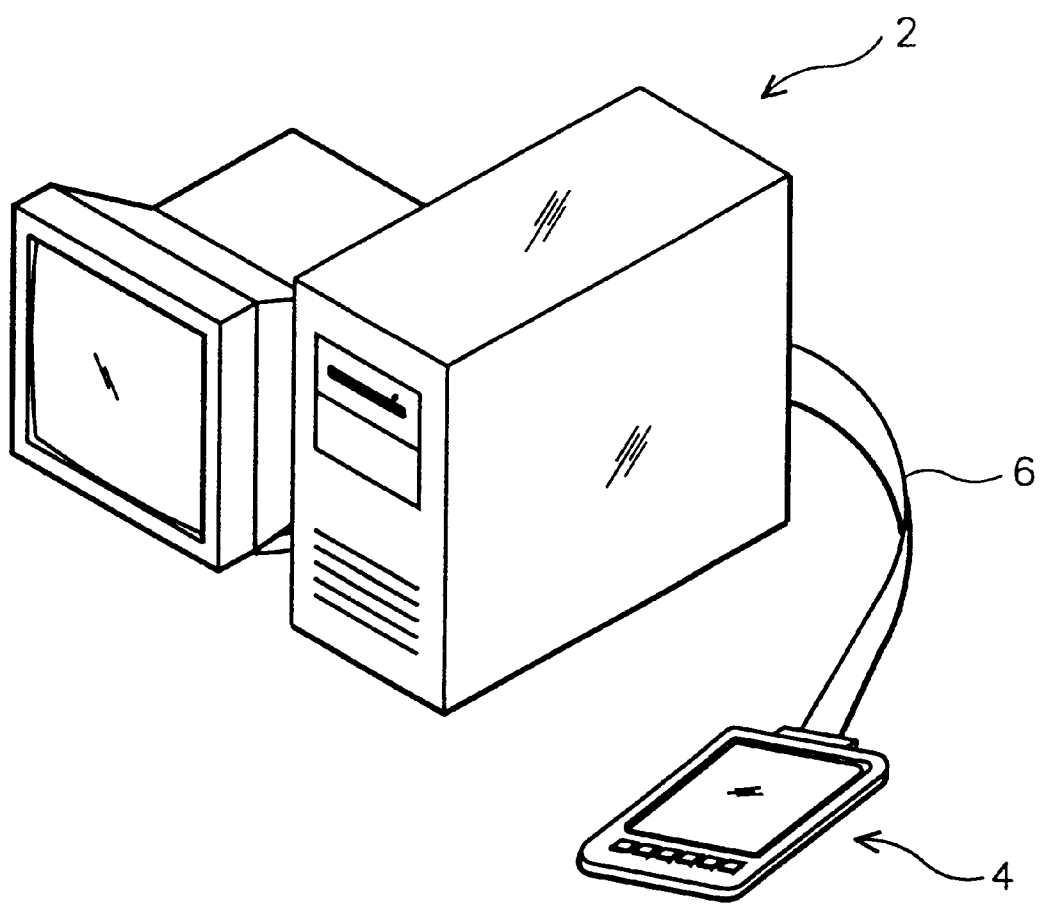
FIG. 1 illustrates the connection of a computer monitoring apparatus according to the present invention to a computer system.

FIG. 1 illustrates the connection of a computer monitoring apparatus according to the present invention to a computer system which includes a plurality of components for executing a data processing function. These components are substantially interconnected by a system bus of the computer system 2. The computer monitoring apparatus 4 is connected to the computer system 2 through a parallel port cable 6 for transferring data therebetween.

Figure 2:
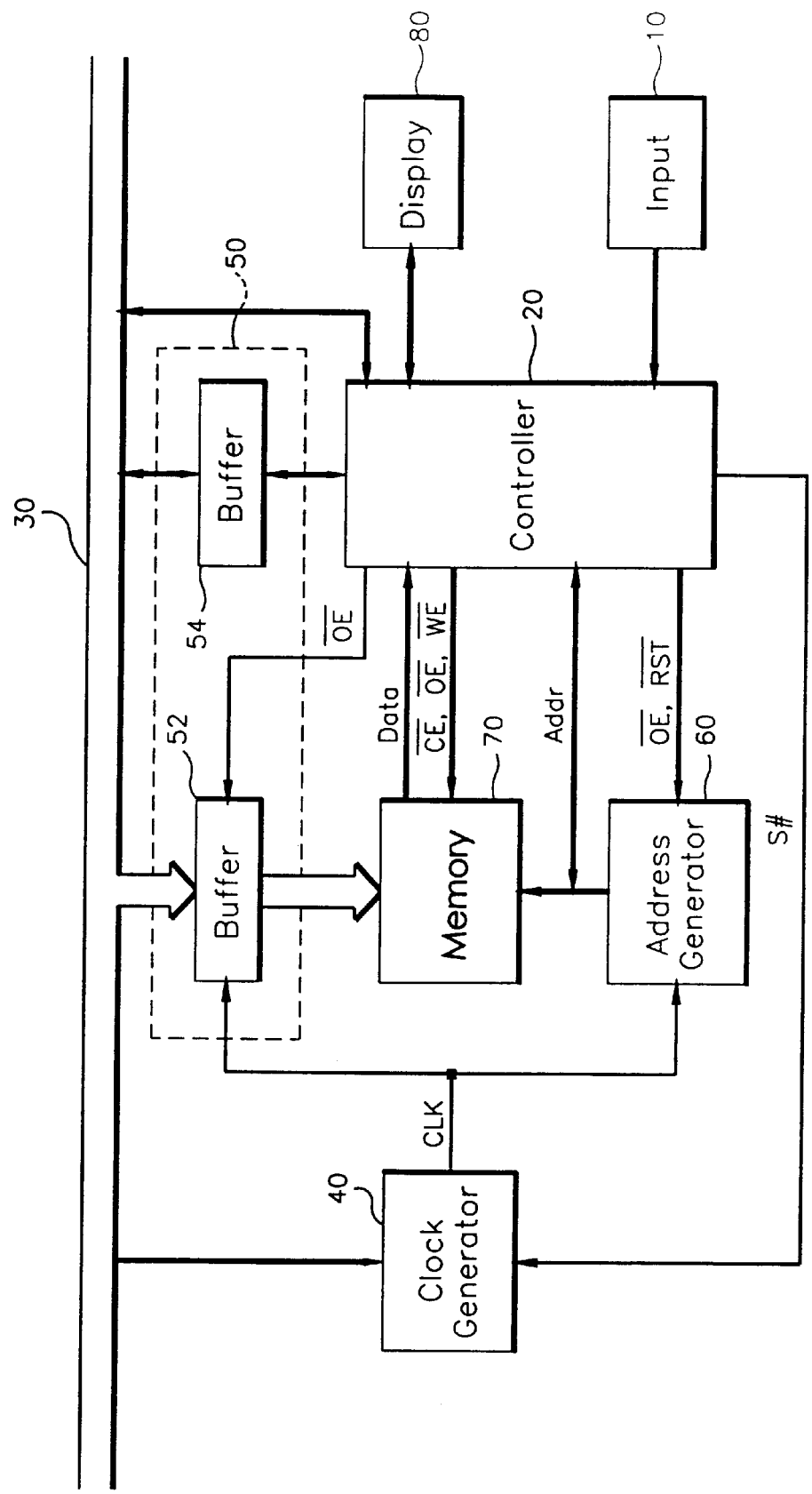
FIG. 2 is a circuit diagram of the computer monitoring apparatus which is connected with a system bus of the computer system shown in FIG. 1.

Referring to FIG. 2, the computer monitoring apparatus of the present invention is connected with a system bus 30 which is included in the computer system 2 to transfer information between the components (not shown) therein. The apparatus comprises seven main sections, including an input 10, a controller 20, a clock generator 40, a temporally storing section 50, an address generator 60, a memory 70 and a display section 80. The input 10 has a plurality of keys which are used to generate function selection signals necessary for monitoring in accordance with a key entry of an operator. The function selection signals generated thus are supplied to the controller 20. The controller 20 may be made up of a microcomputer in which control programs are established.

Figure 3:
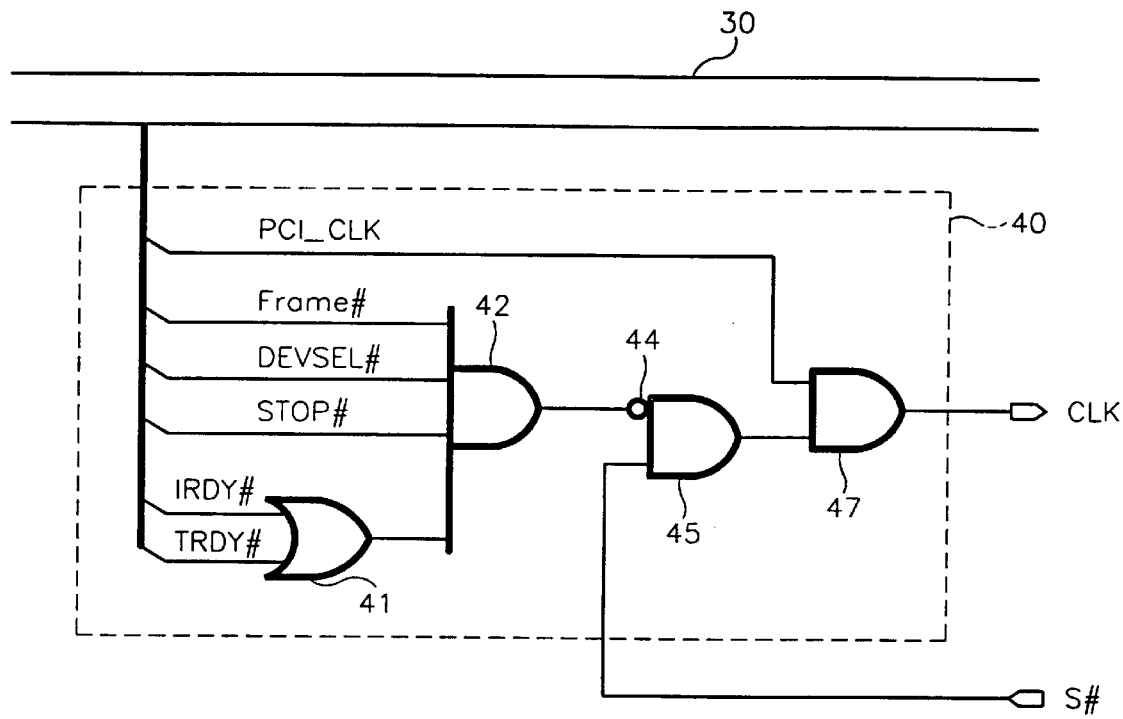
FIG. 3 is a detailed circuit diagram of the clock generator which is connected with the system bus.
Figure 4:
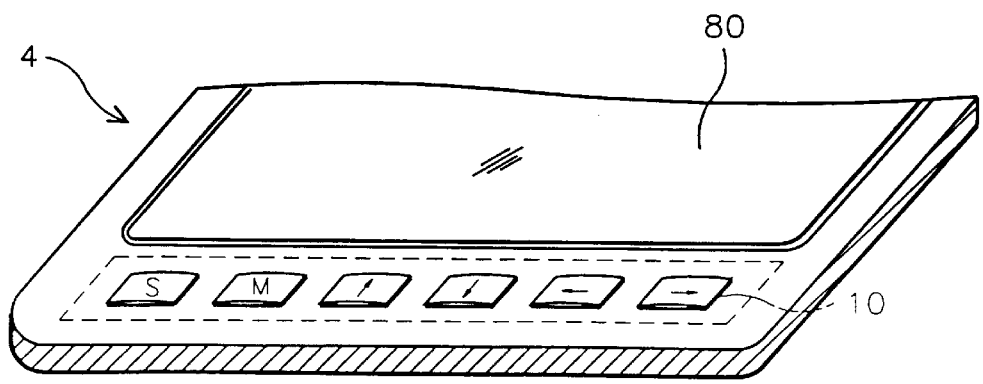
FIG. 4 illustrates a key-pad arrangement which is provided on the computer monitoring apparatus shown in FIG. 1.

The clock generator 40 may have different configurations according to the bus types of the system bus 30. In this example, a PCI (Peripheral Component Interface) bus, which provides a minimum bottle neck between the components interconnected by a system bus so as to process data at high speed, is used as the system bus 30. The clock generator 40 has several gate circuits for receiving a plurality control signals, as shown in FIG. 3. Of the gate circuits, OR gate circuit 41 receives two control signals IRDY# and TRDY# from the system bus 30 to detect whether any one of them is inputted. The control signals IRDY# and TRDY# are used to read and write data between an initiator and a target which are not shown in figures. Herein, the initiator means that it connects with the peripheral component interface bus 30 and causes a transaction operation. The target means that it connects with the peripheral component interface bus 30 and is indicated by the initiator.

Also, other control signals Frame#, DEVSEL# and STOP# from the system bus 30 are provided to input terminals of an AND gate circuit 42, together with the output of the OR gate circuit 41. Frame# is generated while a specific one of the several components connected to the peripheral component interface bus 30 functions as a master in order to control other components. This signal Frame# is at low level during the time related to data processing. DEVSEL# becomes at low level when a specific component is determined as a target device by decoding address signals from the peripheral component interface bus 30. STOP# from a target device is a request signal used to inhibit a data processing operation of the initiator.

Output of the AND gate circuit 42 is provided via an inverter 44 to input terminals of an AND gate circuit 45, together with a control signal S# from the controller 20. Output of the AND gate circuit 45 is provided input terminals of the AND gate circuit 47, together with a bus clock signal PCI_CLK from the peripheral component interface bus 30. Thus, output of the AND gate circuit 47 (i.e., the output of the clock generator 40) generates a clock signal which is required to operate the computer monitoring apparatus 4.

As described above, if at least one of the control signals is activated or applied to the system bus 30, a data signal transferred through the system bus is effective. At this time, the output of the AND gate circuit 42 becomes low and is changed to a high level by the inverter 44 to be applied to the AND gate circuit 45. Thus, the output of the AND gate circuit 45 is at high level while the control signal S# from the controller 20 is at high level. As a result, the AND gate circuit 47 generates through its output terminal the same clock as the bus clock signal PCI_CLK which is provided from the system bus 30.

If none of the control signals from the system bus 30 are activated, an effective data signal is not transferred through the system bus. Thus, no clock signal is generated from the AND gate circuit 47. If the control signal S# of low level is also applied to the AND gate circuit 45, no clock signal is generated from the AND gate circuit 47.

In addition, the temporally storing section 50 has two buffers 52 and 54, one of which is provided to temporally store the transferring data on the system bus 30 and the other is provided to temporally store some system information related to the computer components, which are interconnected by the system bus 30. The buffer 52, which is enabled by an enable signal /OE from the controller 20, stores the transferring data on the system bus 30, synchronizing with the clock signal from the clock generator 40. The data stored in the buffer 52. The buffer 54 may be made of a bi-directional buffer which is located between the system bus 30 and the controller 20.

The address generator 60 may be constituted by a ring counter which is controlled by enable and reset signal /OE and /RST and operated in synchronizing with the clock signal from the clock generator 40. Outputs of the ring counter are used as address signals and provided to the memory 70, which is made up of a RAM (random access memory) device. This memory 70, which is controlled by enable signals /CE, /OE and /WE from the controller 20, stores the stored data of the buffer 52 in series by the address signals from the ring counter 60. The display section 80 may be made of a flat display device, such as a liquid crystal display (LCD), which displays the system information and the transferring data by means of the controller 20.

Figure 5A:
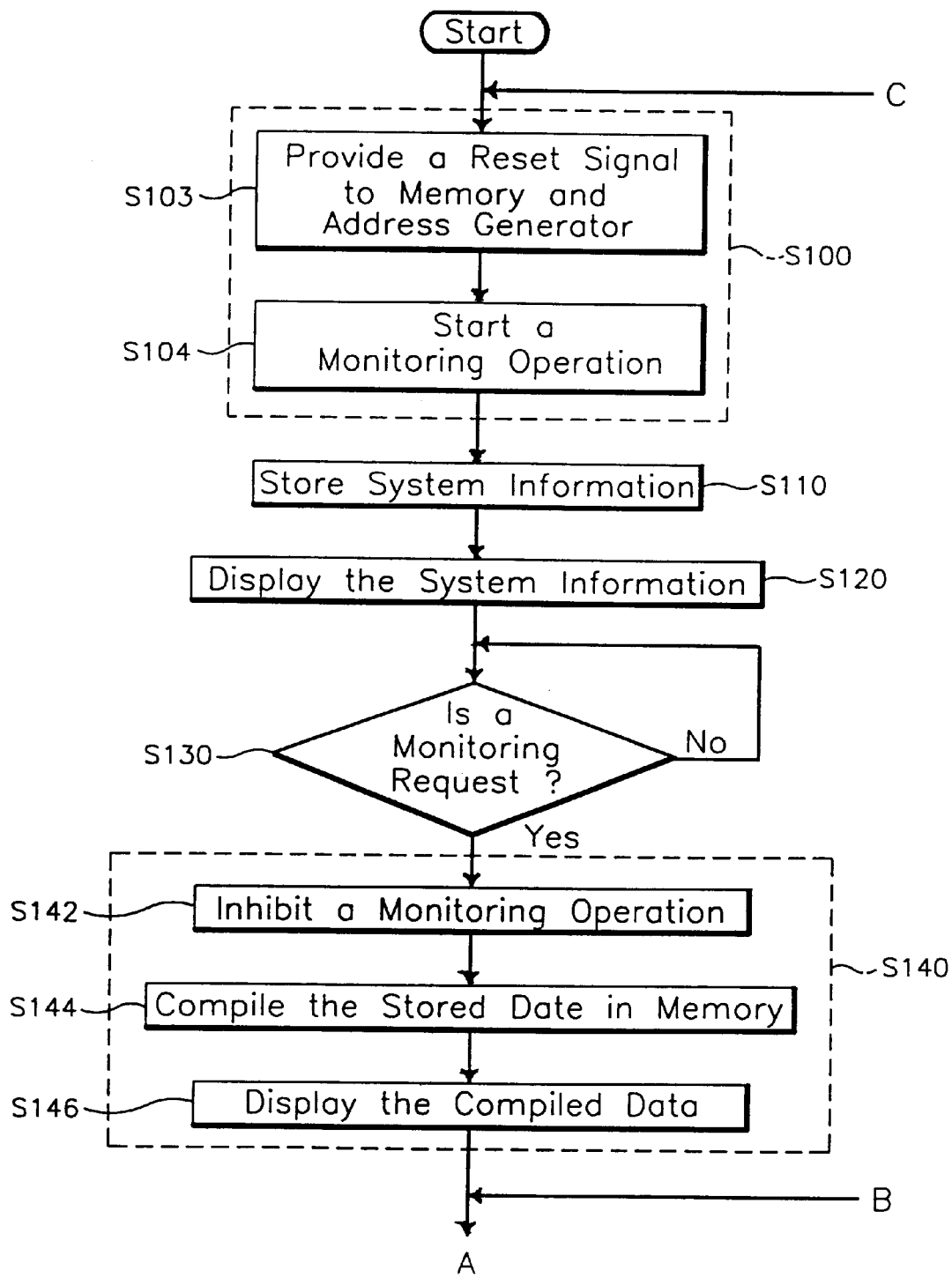
FIGS. 5A and 5B are flow charts setting forth the various steps performed by the computer monitoring apparatus.
Figure 5B:
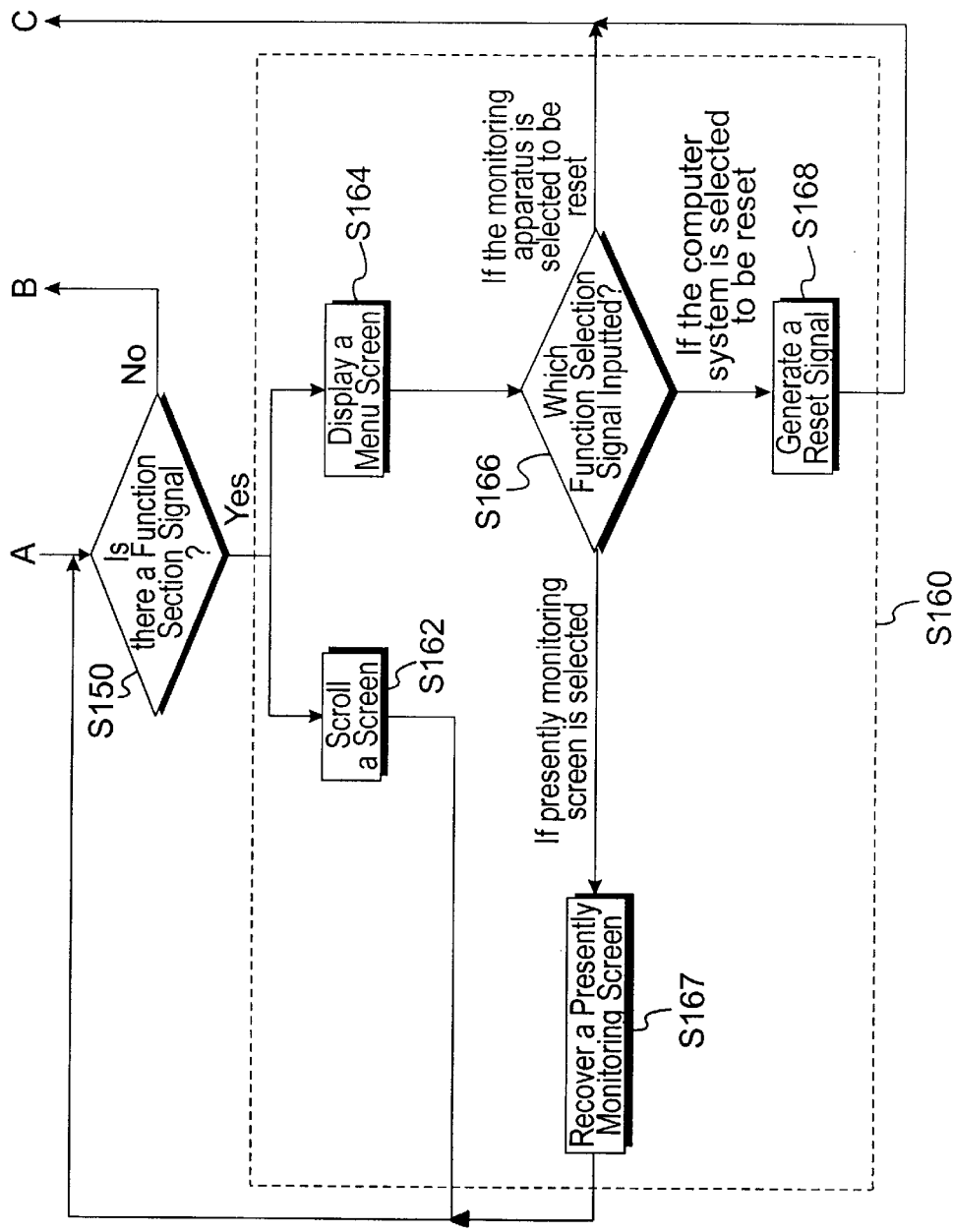

Hereinafter, the method of controlling the computer monitoring apparatus of FIG. 2 will be described in detail with reference to FIGS. 2 through 5. FIGS. 5A and 5B are flow charts setting forth the various steps (i.e., control programs) performed by the computer monitoring apparatus.

Control of the computer monitoring apparatus is achieved by the controller 20, particularly, the control programs installed therein. Referring to FIG. 5A, at step S100, an initializing routine is executed for the computer monitoring apparatus when the computer system for use with the apparatus being powered on or reset. During this routine S100, the memory 70 is cleared by a chip enable signal /CE from the controller 20 and the address generator 60 is reset by a reset signal /RST from the controller 20 (step S103). At next step S104, the control signal S# is set to high level and the output signals /OE from the controller 20 is provided to the buffer 52 and the address generator 60. As a result, the computer monitoring apparatus starts to be operated for monitoring the operating conditions of the computer system. Accordingly, the data signals being transferred through the system bus 30 are sequentially stored in the memory 70 every when each of the data signals is effective. During the initializing routine, the computer system accumulates its system information. If the initializing routine is completed, the system information accumulated thus are applied through buffer 54 to the controller 20, and the control proceeds to step S110 wherein the controller 20 receives and stores the system information. At step S120, the system information is provided to the display section 80 to be displayed, and the control proceeds to step S130 where it is determined whether a key entry necessary for monitoring is required from the input section 10.

If so, the control proceeds to step S140, where a control routine S140 for displaying the latest monitoring information is performed and the control proceeds to step S142 in response to the key entry. The monitoring information include some system information related to each system configuration of device components connected with the system bus 30, and some data information being transferred through the system bus. The system information include the CPU (central processing unit) type, the operational frequency of central processing unit, the capacity of memory and the like. At step 142, the clock generator 40 does not generate address signals by the control signal S# of low level so that the data signal being transferred through the system bus 30 is not stored in the buffer 42 and not applied to the memory 70. Also, no address signal is generated from the address generator 60. As a result, the monitoring operation is inhibited and the control proceeds to step S144.

At step S144, all the data stored in the memory 70 is compiled in order that an operator can easily understand the data, and the control proceeds to step S146 where the compiled data is provided to the monitor section 80 to be displayed thereon.

Subsequently, the control proceeds to step S150, as shown in FIG. 5B, where it is determined whether there is a key entry for selecting a specific function from the input section 10. If so, the control proceeds to step S160. At step S160, if a screen scrolling key entry occurs, the control proceeds to step S162 where the screen is scrolled. Alternatively, if a key entry for displaying a menu occurs, the control proceeds to step S164 where a menu is displayed. The above described function selection can be achieved by pushing down one of the key pads, which are provided on the input section 10. The controller 20 then performs function control programs corresponding to the respective key pads. The screen scrolling key may be one of the key pads such as a right, a left, a upward and a downward direction key pad.

At step S166, if a presently monitoring screen is selected, the control proceeds to step S167 where the presently monitoring screen can be recovered. Alternatively, if the monitoring apparatus is selected to be reset, the control jumps to step S100 to start the initializing routine again. If the computer system is selected to be reset, the control proceeds to step S168 where the reset signal is provided through the system bus 30 to the computer system. As a result, the computer system is reset.

As described above, according to a computer monitoring apparatus for use with a computer system, an operator can monitor the hardware information connected with a system bus and the operating conditions of the computer system. Even though the computer system is halted or occurs an error during the operation thereof, an operator can monitor the operating conditions of the computer system so that he can easily check the reason caused by the system failure of the computer system or the occurrence of error therein.

What is claimed is:

1. A computer monitoring apparatus, comprising:
    a controller generating an operation inhibiting signal and a plurality of control signals controlling overall functions of a computer monitoring apparatus connectable to a computer system having a plurality of components interconnected by a system bus for transferring information between said components;
    a clock generator generating a clock signal in response to said control signals and inhibiting said generation of said clock signal in response to said operation inhibiting signal;
    a buffer temporally storing system information related to said components and data information being transferred through said system bus by means of said controller;
    an address generator receiving said clock signal from said clock generator and generating an address signal;
    a memory responsive to said control signals from said controller, storing said system information from said buffer means in accordance with said address signal; and
    a display section displaying said system and said data information on a video screen, wherein said buffer means comprises a first buffer responsive to an enable signal of said control signals from said controller, storing said data information on said system bus in synchronism with said clock signal, and a second buffer storing said system information from said system bus.

2. A computer monitoring apparatus, comprising:
    a controller generating an operation inhibiting signal and a plurality of control signals controlling overall functions of a computer monitoring apparatus connectable to a computer system having a plurality of components interconnected by a system bus for transferring information between said components;
    a clock generator generating a clock signal in response to said control signals and inhibiting said generation of said clock signal in response to said operation inhibiting signal;
    a buffer temporally storing system information related to said components and data information being transferred through said system bus by means of said controller;
    an address generator receiving said clock signal from said clock generator and generating an address signal;
    a memory responsive to said control signals from said controller, storing said system information from said buffer in accordance with said address signal; and
    a display section displaying said system and said data information on a video screen. said clock generator comprises an OR gate circuit receiving first and second control signal of said control signals, a first AND gate circuit receiving an output of said OR gate circuit and third, fourth and fifth controls signals of said control signals, an inverter receiving an output of said first AND gate circuit, a second AND gate circuit an output of said inverter and said operation inhibiting signal from said controller, and a third AND gate circuit receiving an output of said second AND gate circuit and a main clock signal from said system bus.

3. A method of controlling a computer monitoring apparatus, comprising:
    providing an input section comprised of a plurality of keys, generating a function selection signal necessary for monitoring, a controller generating an operation inhibiting signal and a plurality of control signals required for controlling overall functions of the computer monitoring apparatus, a clock generator generating a clock signal in response to said control signals and inhibiting occurrence of said clock signal in response to said operation inhibiting signal, a buffer temporally storing system information related to a plurality of components which are interconnected by a system bus of a computer system and data information being transferred through said system bus by means of said controller, an address generator receiving said clock signal from said clock generator and generating an address signal by means of said controller, a memory responsive to said control signals from said controller, storing said system information from said buffer means in accordance with said address signal, and a display section displaying said system and said data information on a screen thereof;

initializing said computer monitoring apparatus;

storing said system information from said computer system;

displaying said system information on said display section;

determining whether a key entry necessary for monitoring is inputted by an operator;

displaying, when said key entry is entered by an operator, the latest monitoring results on said display section;

determining whether a key entry for selecting a function is entered; and performing, when said key entry is entered, a function control program corresponding to said selected key entry, said step of performing said function control program comprised of scrolling a screen in a direction when said key entry for selecting a function corresponds to a screen scroll signal, displaying a menu when said key entry for selecting a function corresponds to a menu display signal, and performing a function corresponding to said menu in accordance with said menu selecting key entry.

4. The method of said computer monitoring apparatus according to claim 3, said step of initializing said apparatus comprises resetting said memory and said address generator, and starting a monitoring operation of said apparatus.

5. The method of said computer monitoring apparatus according to claim 3, said step of displaying said latest monitoring result comprises inhibiting said monitoring operation, compiling information stored in said memory, and displaying the compiled information.

6. The method of said computer monitoring apparatus according to claim 3, said step of performing said function corresponding to said menu comprises recovering a presently monitoring screen when said presently monitoring screen may be selected, initializing said apparatus when said apparatus is selected, and resetting said computer system when said computer system is selected to be reset.

\* \* \* \* \*